C. A. CHANDLER.
COTTON SEED HULLER.
APPLICATION FILED MAR. 21, 1908.

916,913.

Patented Mar. 30, 1909.
2 SHEETS—SHEET 2.

Witnesses.
F. R. Roulstone
E. V. Batchelder

Inventor.
C A Chandler
By Wright, Brown, Quinby & May
Attys

UNITED STATES PATENT OFFICE.

CLARENCE A. CHANDLER, OF EAST BRIDGEWATER, MASSACHUSETTS.

COTTON-SEED HULLER.

No. 916,913.  Specification of Letters Patent.  Patented March 30, 1909.

Application filed March 21, 1908. Serial No. 422,426.

*To all whom it may concern:*

Be it known that I, CLARENCE A. CHANDLER, of East Bridgewater, in the county of Plymouth and State of Massachusetts, have invented certain new and useful Improvements in Cotton-Seed Hullers, of which the following is a specification.

This invention relates to machines for hulling cotton seeds of the type shown in my Patent No. 317,927, granted May 12, 1885, and which comprises a cylinder having a multiplicity of plates or knives, and an outer portion, usually referred to as the "concave", being adjustably mounted at one side of the cylinder and having a multiplicity of knives which coöperate with the cylinder knives.

One of the objects of my present invention is to provide an improved structure of the cylinder knives, comprising separable members so that the actual cutting portions, when worn, may be removed and others substituted therefor, without requiring the discarding of the entire body of the plate.

Another object is to provide an improved structure of the outer plates or knives which are mounted in the concave, so that each not only presents two cutting angles when in position, but may be altered or shifted in position relatively to the concave so that two new cutting edges may be presented four times.

To these ends, my invention consists in the construction and combination of parts substantially as hereinafter described and claimed.

Figure 1:
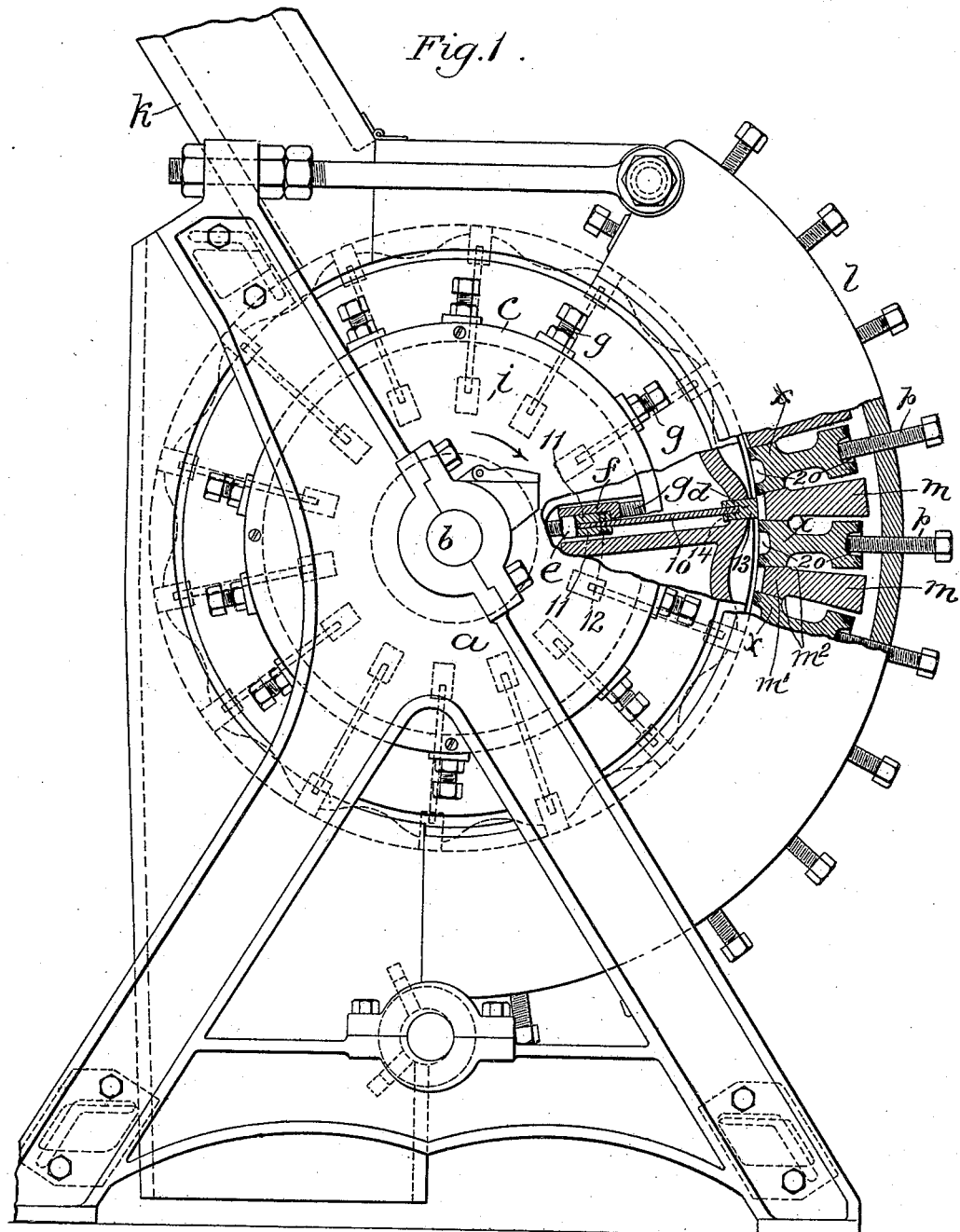
Figure 2:
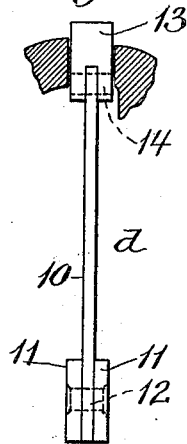
Figure 3:
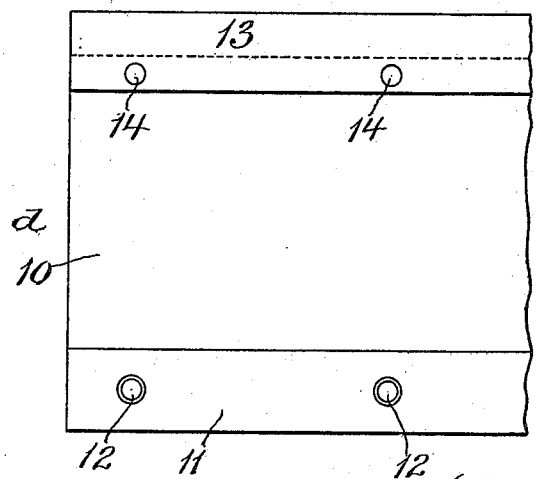
Figure 4:
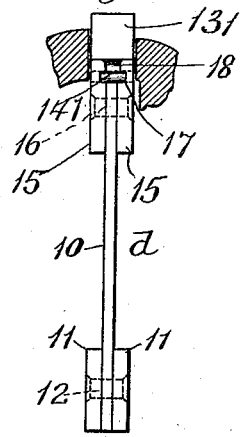
Figure 5:
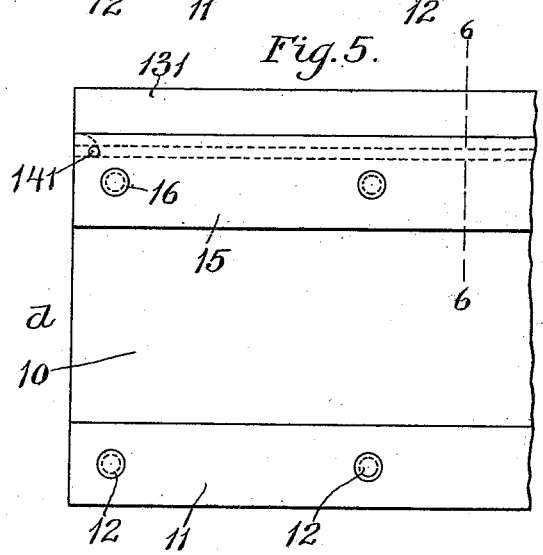
Figure 6:
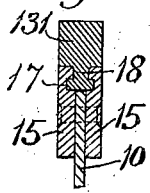
Figure 7:
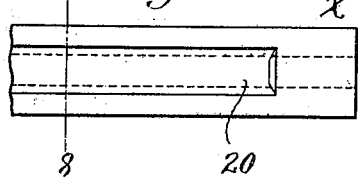
Figure 8:

Of the accompanying drawings in which similar reference characters indicate the same or similar parts in all of the figures; Figure 1 represents a side elevation, partly in section, of a cotton seed huller embodying my present improvements. Fig. 2 is a detail end view of one of the cylinder knives, said figure also showing a portion of the cylinder in section. Fig. 3 is a side elevation of one of the cylinder knives. Figs. 4 and 5 are views similar to Figs. 2 and 3 but showing a different structure of cylinder knife, these two figures in fact illustrating what I now consider to be the preferred form for said knives. Fig. 6 represents a detail section on line 6—6 of Fig. 5. Fig. 7 is an edge view of a portion of one of the knives mounted in the concave. Fig. 8 represents a section on line 8—8 of Fig. 7.

The frame $a$ of the machine which supports the arbor or shaft $b$ on which the cylinder $c$ is mounted, may be practically the same in construction as in my said Patent No. 317,927. The plates $d$, as a whole, are somewhat similarly mounted. The difference in the construction of the plates will be pointed out hereinafter. Said plates are adjusted by means of screws $e$, key-plates $f$ and screws $g$, all as in my patent aforesaid. The end plates or disks $i$, the chute $k$ and the concave $l$ and its mounting and adjustment are also shown practically the same as in my said patent. Interposed between the knives of the concave are blocks $m$, and the knives in the concave are adjusted inward by means of screws $p$. In the present construction, the knives of the concave are indicated as a whole at $x$.

Referring now especially to Figs. 1, 2 and 3, it will be seen that each of the cylinder knives comprises a web 10 having strips 11 secured on opposite sides of its inner edge by suitable means such as rivets, said strips forming shoulders which are engaged by the key-plates $f$. By having the two strips 11, either one of them may be engaged by the key-plate $f$ according to the position in which the knife as a whole is inserted in the cylinder. The outer edge of the web 10 has removably secured to it the knife or cutting bar 13, pins 14 serving as the means for removably connecting the cutting bar to the said web. Obviously, with this construction, the webs may be of soft metal, and also the shoulder strips 11, but the knives or cutting bars 13 are preferably of steel. The knife bars are grooved and the edges of the webs or plates fit said grooves, whereby the said webs or plates may be made quite thin, while the bars are sufficiently thick to afford the necessary rigidity and present two cutting angles either one of which may be utilized by reversing it as presently described. When a knife bar becomes worn at one cutting edge according to the direction of rotation of the cylinder, the plate and bar as a whole may be removed and turned around and reinserted and secured in position by the key-plate $f$. And when the entire knife bar 13 has become worn down both by its working operation and by grinding and sharpening it, it may be removed from the web 10 and a new bar substituted therefor. The pins 14 do not require to be headed down like rivets because they are preferably so located that they will be held in position endwise by the walls of the radial recesses in the cylinder through which the knives extend.

As shown in Figs. 4, 5 and 6, the structure whereby the knives or cutting bars are removably connected to the webs, comprises strips 15 which are secured along the upper edge of the web 10 as by rivets 16, the edges of the strips 15 which project beyond the edge of the web 10 having internal grooves 17. The knife or cutting bar 131 is formed with a tongue portion 18 which extends in between the edges of the strips 15, and into the grooves 17 thereof. This provides a structure whereby the knife bar may be inserted endwise to its position relatively to the web 10, and the strips 15 of the latter. Although the cutting bar may fit so tightly as not to slip longitudinally, I prefer to employ retaining means at one or both ends such as a pin 141 passed through holes in the strips 15 and crossing the end of the tongue 18.

It will now be understood that, in use, the webs of the cylinder plates $d$ are never altered in width by use or by grinding the knives. Whenever the knife bars are worn or ground down too far, they are replaced by others. This results in economy since the webs 10 and their strips 11 (and the strips 15 when the latter structure is employed) are capable of indefinite use. The wear of use or grinding comes only on the relatively narrow knife bars 13 and 131, but said knife bars are thick enough to afford rigidity and to be turned side for side on the webs 10, or the entire knife structure may be turned side for side in the cylinder, or new knife bars may be applied to the webs whenever desired.

Referring now to Figs. 7 and 8 in connection with Fig. 1, it will be seen that each outer plate $x$ which is mounted radially in the concave, comprises a bar which is longitudinally grooved at 20, which groove not only serves as the seat for the adjusting screws $p$ at the outer or non-using edge of the bar, but said groove along the inner edge of the bar, divides that edge into two cutting portions. Each edge of the bar presents four angles, two of them resulting from the meeting of the end face with the two side faces, and the other two resulting from the meeting of the end face with the walls of the groove 20. Therefore the operative edge of the bar $x$ presents two cutting angles and when turned around, presents two other cutting angles. When said bar is removed from the concave and turned edge for edge and reinserted, a new inner edge is presented which may in turn be turned side for side to present two new cutting angles in place of two worn cutting angles.

The bar $x$ may be formed of wrought iron with case hardened edges or it may be of cast iron chilled. As will be readily understood, each bar $x$ presents eight cutting angles, two of which are presented for simultaneous use, the bar being therefore capable of four different locations to present two new cutting angles each time. Each bar $x$ is mounted in the concave so that its greatest transverse dimension is radial, the grooves 20 being in the inner and the outer edges. Each bar $x$ therefore takes the place of two bars in my Patent 317,927 before referred to, and as the screws $p$ bear on the bottom of the outer grooves of the series of bars, said screws can not injure the bars so as to interfere with their effectiveness when turned edge for edge. And said arrangement reduces the number of screws $p$ required, by one half; also reducing the time required to make an adjustment of the parts by means of such screws.

As shown in Fig. 1, the blocks $m$, which are usually of wood and are formed with wedge portions $m'$ which contact with the alternating knife bars $x$, are reduced in thickness beyond said wedge portions, as shown at $m^2$, so as to present no surfaces that will interfere with the introduction and removal of the knife bars if the latter should not be accurate in shape.

I claim:—

1. In a hulling machine, the combination with the cylinder, of webs or plates carried by the cylinder, said webs having relatively thick knife bars attached to their outer edges, and means whereby each of the said webs and bars may be adjusted as a unit in the cylinder.

2. In a hulling machine, the combination with the cylinder, of webs or plates having shoulder strips attached to their inner edges, knife bars removably connected with the outer edges of the webs, pins for preventing endwise movement of the knife strips, and means engaging said shoulders for adjusting the webs in the cylinder.

3. A cylinder knife for hulling machines, comprising a continuous web or plate and a relatively thick knife bar mounted on and removably attached to one edge thereof.

4. A cylinder knife for hulling machines, comprising a continuous web or plate having two shoulder strips attached to its inner edge and having a relatively thick knife bar removably connected to its outer edge.

5. In a hulling machine, the combination with the concave thereof, of radial cutting bars mounted therein, each of said bars having its inner and outer edges longitudinally grooved to present a plurality of cutting angles, and adjusting screws entering the grooves in the outer edges of said radial bars.

In testimony whereof I have affixed my signature, in presence of two witnesses.

CLARENCE A. CHANDLER.

Witnesses:
A. W. HARRISON,
ARTHUR H. BROWN.